United States Patent
Breeding et al.

(10) Patent No.: US 7,983,186 B2
(45) Date of Patent: Jul. 19, 2011

(54) DEFINING LOST EVENT TALLEY TAG PACKETS WHEN PET COUNT RATES EXCEED AVAILABLE ACQUISITION BANDWIDTH

(75) Inventors: John E. Breeding, Knoxville, TN (US); Michael E. Casey, Louisville, TN (US); Jimmy Everman, Maryville, TN (US); William F. Jones, Knoxville, TN (US); Wing K. Luk, Knoxville, TN (US); Johnny H. Reed, Clinton, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 201 days.

(21) Appl. No.: 12/558,055

(22) Filed: Sep. 11, 2009

(65) Prior Publication Data

US 2010/0061263 A1 Mar. 11, 2010

Related U.S. Application Data

(60) Provisional application No. 61/096,026, filed on Sep. 11, 2008.

(51) Int. Cl.
  *H04L 12/26* (2006.01)
(52) U.S. Cl. ........................................................ 370/252
(58) Field of Classification Search .......... 370/229–235, 370/252–254, 389, 394, 395.5, 395.52, 468–477
See application file for complete search history.

(56) References Cited

U.S. PATENT DOCUMENTS

| | | | |
|---|---|---|---|
| 5,963,551 A * | 10/1999 | Minko | 370/356 |
| 6,188,674 B1 * | 2/2001 | Chen et al. | 370/252 |
| 2005/0253074 A1 * | 11/2005 | Jones et al. | 250/363.04 |
| 2007/0258383 A1 * | 11/2007 | Wada | 370/252 |

OTHER PUBLICATIONS

Jones et al, PET Gantry Simulation: Concepts and Methods for Inexpensively Reproducing the PET Data Acquisition Environment Using a Single PC with the PDT Card, IEEE, 5 pages, 2007.*

* cited by examiner

*Primary Examiner* — Frank Duong
(74) *Attorney, Agent, or Firm* — Peter L. Kendall

(57) ABSTRACT

A system identifies when received packets are lost at a node in a multi-node processing chain. The system processing chain may include a gantry interface module for receiving coincident event data from a PET (Positron Emission Tomography) detector array, a DMA (direct memory access) rebinner card, and a transmission line coupled between the gantry interface module and the DMA card. FPGA and FIFO elements in each processing portion receive packets that may be lost if there is insufficient FIFO capacity. Lost packets are marked, discarded, and counted. At specified intervals, set in accordance with a threshold number of packets received a lost tally data packet is generated that includes count information for lost packets. The lost tally data packet is forwarded downstream when sufficient storage capacity exists.

20 Claims, 4 Drawing Sheets

DEFINING LOST EVENT TALLEY TAG PACKETS WHEN PET COUNT RATES EXCEED AVAILABLE ACQUISITION BANDWIDTH

RELATED APPLICATIONS

Priority is claimed under 35 U.S.C. §119(e) from copending provisional application Ser. No. 61/096,026, filed Sep. 11, 2008.

BACKGROUND

The present disclosure relates to Positron Emission Tomography (PET) data acquisition, more particularly to tracking loss of coincident event packets in real time.

Nuclear medicine is a unique medical specialty wherein radiation is used to acquire images which show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions which emanate from the body and are captured by a scintillation crystal, with which the photons interact to produce flashes of light or "events." Events are detected by an array of photodetectors, such as photomultiplier tubes, and their spatial locations or positions are calculated and stored. In this way, an image of the organ or tissue under study is created from detection of the distribution of the radioisotopes in the body.

One particular nuclear medicine imaging technique is known as Positron Emission Tomography, or PET. PET is used to produce images for diagnosing the biochemistry or physiology of a specific organ, tumor or other metabolically active site. Measurement of the tissue concentration of a positron emitting radionuclide is based on coincidence detection of the two gamma photons arising from positron annihilation. When a positron is annihilated by an electron, two 511 keV gamma photons are simultaneously produced and travel in approximately opposite directions. Gamma photons produced by an annihilation event can be detected by a pair of oppositely disposed radiation detectors capable of producing a signal in response to the interaction of the gamma photons with a scintillation crystal. Annihilation events are typically identified by a time coincidence between the detection of the two 511 keV gamma photons in the two oppositely disposed detectors, i.e., the gamma photon emissions are detected virtually simultaneously by each detector. When two oppositely disposed gamma photons each strike an oppositely disposed detector to produce a time coincidence event, they also identify a line of response, or LOR, along which the annihilation event has occurred.

When the rate of PET coincidence detection exceeds the receiving rate provided by the PET data handling system, PET patient data are lost. Ideally, PET data collection systems of sufficiently high bandwidth are made available to avoid such loss. However, the size of the PET detector array is ever expanding as the state of the art progresses. Optical matching of maximum possible data collection rates to that of maximum possible data generation rates is not always possible.

If the actual generated PET coincidence event data cannot be stored and/or processed as generated, precisely tracking the loss of such data can preserve the accuracy of PET quantitation. Techniques are thus needed for keeping precise track of loss of PET coincidence data in real time.

DISCLOSURE

The above needs are met, at least in part, by a system that identifies when received packets are lost at a node in a multi-node processing chain. The system processing chain may include a gantry interface module for receiving coincident event data from a PET (Positron Emission Tomography) detector array, a DMA (direct memory access) rebinner card, and a transmission line coupled between the gantry interface module and the DMA card. The transmission line may be a fiber optic connection. The interface module and DMA card each contain a field programmable gate array (FPGA) and FIFO storage capability for temporarily storing data packets during processing operations that involve the respective FPGAs.

A node at each input to a respective FIFO is a point of possible packet loss if the current FIFO storage capacity is insufficient to store an incoming packet to be input from the respective FPGA. These nodes thus may be termed "lossy nodes." Each FPGA, upon determining FIFO capacity insufficiency for an incoming packet, marks the incoming packet as lost, and discards the incoming packet from the processing chain. Counters coupled to the FPGAs, maintain counts of the number of lost packets, as well as the number packets received, as incremented by the respective FPGA. At specified intervals, set in accordance with a threshold number of packets received, each FPGA generates a lost tally data packet that includes count information for lost packets. The FPGA inputs the lost tally data packet in its FIFO if and when it determines that sufficient storage FIFO capacity exists for the lost tally data packet.

The DMA rebinner card can specify a data collection interval for evaluating saved data from the lost tally data packets received during the collection interval. A correction factor value can be formulated in accordance with a number of lost tally packets received during the data collection interval. The correction factor value provides for evaluation of the collected lost packet information identified for each of the first and second FPGAs.

Additional advantages of the present disclosure will become readily apparent to those skilled in this art from the following detailed description, wherein only preferred embodiments are shown and described, simply by way of illustration of the best mode contemplated. As will be realized, the disclosure is capable of other and different embodiments, and its several details are capable of modifications in various obvious respects, all without departing from the disclosed concepts. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION

Figure 1:
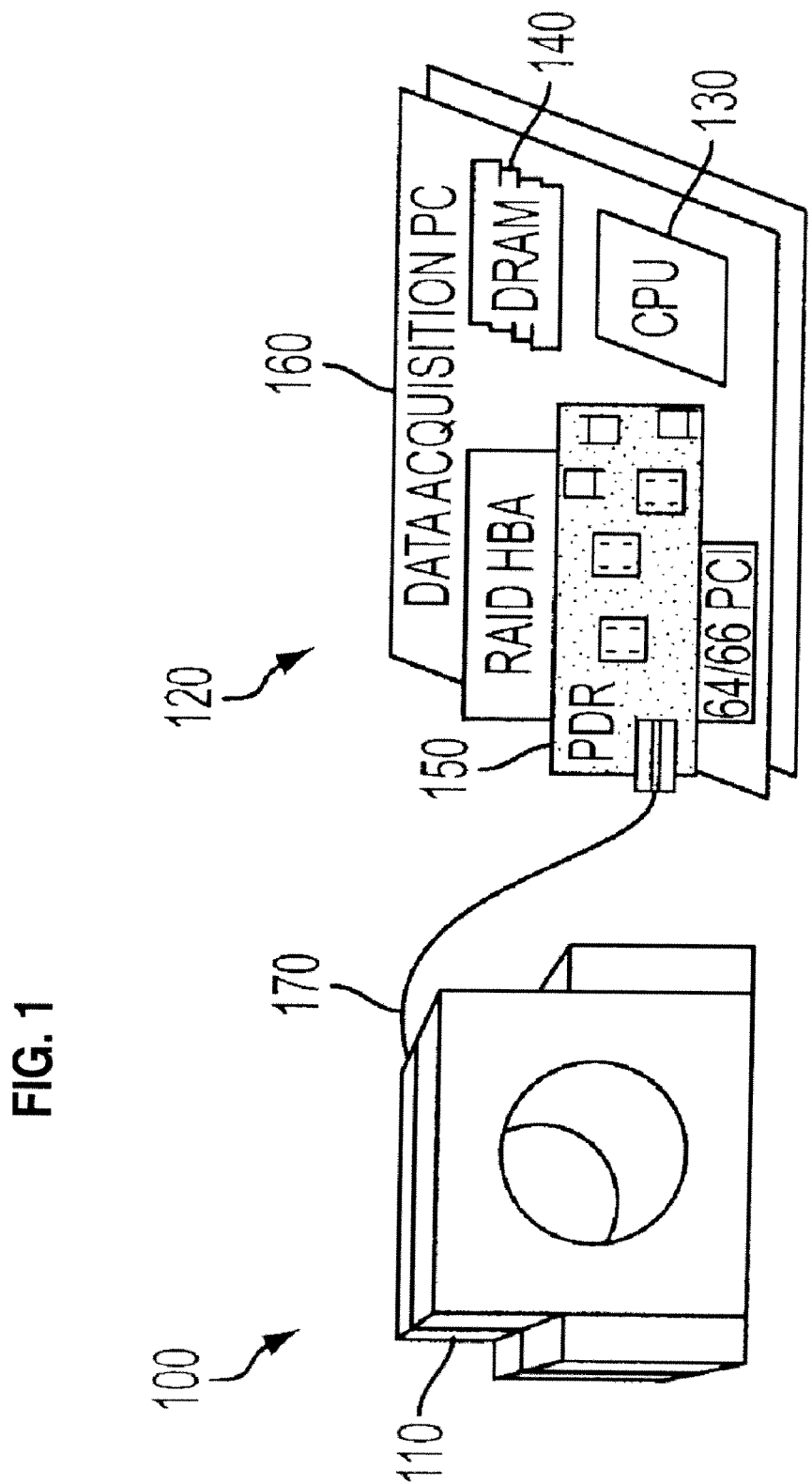
FIG. 1 is system diagram for data acquisition in service to a TOF PET/CT apparatus.

FIG. 1 depicts a system 100 for data acquisition in service to any suitable Long-Axis TOF PET/CT device 110. In one embodiment, TOF PET/CT device 110 may comprise 52 rings of (4×4×20 mm) LSO crystals (624 crystals/ring), a 70 cm diameter field of view (FOV) with a 22 cm axial length, and a 500 ps full width at half maximum (FWHM) time of flight (TOF) resolution. The primary output of TOF PET/CT device 110 may be a data stream over fiber optic line 170. However, any method of sending data from TOF PET/CT device 110 to a processor may be used. Fiber optic stream 170 may have 64-bit detector pair packets. Each packet may comprise a 6-bit field for TOF encoding.

During data acquisition, each TOF bin (out of 60) may be over sampled at 78 ps. Fiber optic stream 170 may be coupled to a data acquisition processor 120. Processor 120 may contain local Redundant Array of Independent Disks (RAID) 160 and a direct memory access (DMA) rebinner card 150. DMA rebinner card 150 may be a Petlink™ DMA rebinner (PDR) made by Siemens, or DMA rebinner card 150 may be any other card capable of supporting on-line TOF mashing along with TOF-MSRB and nearest-neighbor rebinning into a "linear" projection data space.

The primary output from PDR 150 is a stream of 32-bit bin-address packets. The 30-bit bin-address field in this packet may be directly applied for histogramming into the final "mashed" projection data set. The CPU 130 on processor 120 receives these 32-bit packets and performs on-line histogramming as directed by the 30-bit bin-address content of each packet. CPU 130 may histogram directly into a server-resident DRAM 140. Thereafter, the instantly-completed projection data set may be transferred to local RAID 160. Alternatively, the bin-address packets may be stored directly to RAID 160 (or similar storage medium) in a list-mode data acquisition, for later processing. Processor 120 may have an output device capable of outputting the data so that it may be analyzed or reconstructed into 3-D image data, including but not limited to an internet connection, a printer, a monitor, etc.

Figure 2:
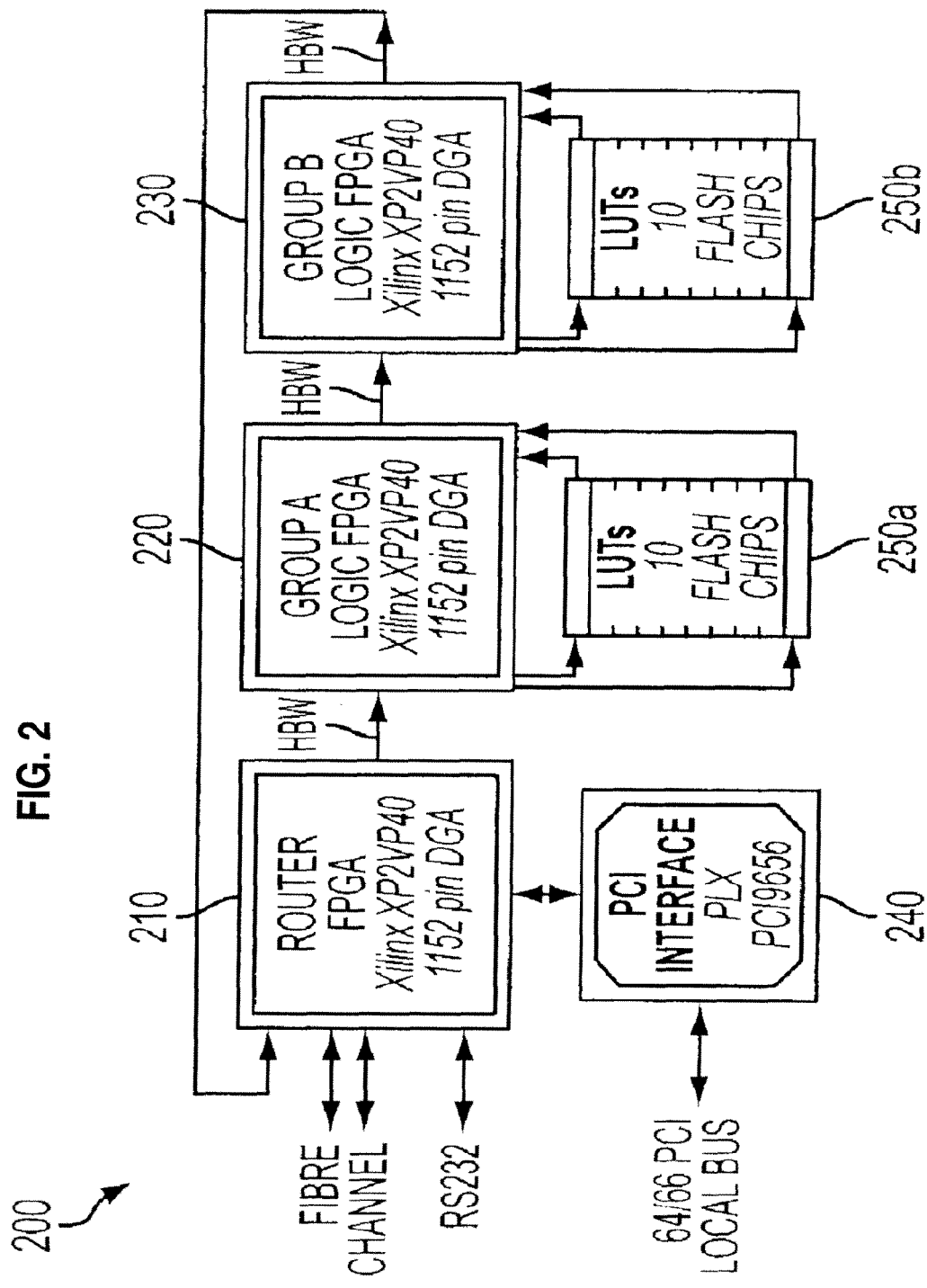
FIG. 2 is a block diagram of flexible integrated circuit chip architecture.

The PDR makes use of FPGA and flash memory chips configured in a digital pipeline for the rapid, on-line and real-time computations necessary for LOR-to-projection-space rebinning. FIG. 2 is a block diagram of chip architecture for a PDR card 200. 64-bit detector-pair packets may arrive into the Router Field Programmable Gate Array (FPGA) 210 via a fiber optic stream. A digital pipeline may be formed using two Logic FPGAs 220 and 230. Each of Logic FPGAs 220 and 230 may be coupled to an array of ten 8 Mbyte flash memory chips 250(a) and (b). Flash memory chips 250(a) and (b) may be programmed to provide look-up tables (LUT) to service the computations required for mapping from detector-pair space into projection data space. The output of the pipeline may be returned to Router FPGA 210 and then outputted by PCI DMA interface 240 in 32-bit bin-address packet form.

Figure 3:
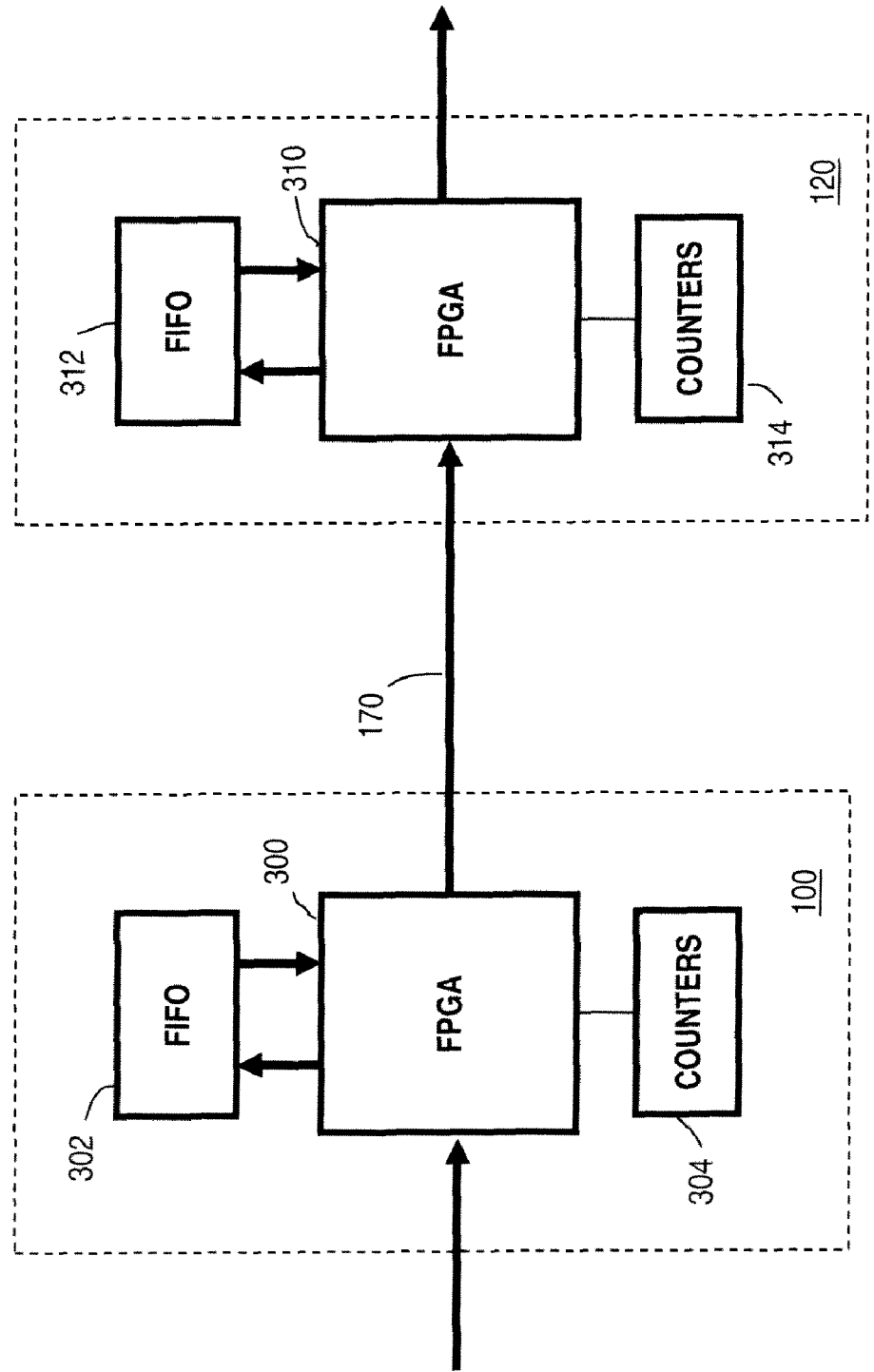
FIG. 3 is a partial block diagram of an on-line PET-stream processing chain employed in the apparatus of FIG. 1.

The block diagram of FIG. 3 is illustrative of flow of PET streaming events and tag packet data. Gantry interface module 100 contains FPGA 300, which receives at its input the initial formation of coincidence event packets from the detector array. Event and tag packets are loaded into local FIFO 302 by FPGA 300 for temporary storage. FPGA 300 is programmed to continually unload FIFO 302 when FIFO content is present for transmission on link 170. FPGA 300 will unload packets from local FIFO 302 for transmission via fiber optic channel 170 to data acquisition processor 120. A plurality of counters 304 are coupled to FPGA 300. The counters are used to maintain counts of incoming packets and lost packets, respectively.

The transmitted packets are received by FPGA 310 in the (DMA) rebinner card. These packets are loaded into local FIFO 312 by FPGA 310 for temporary storage. A plurality of counters 314 are coupled to FPGA 310. FPGA 310 will unload packets from local FIFO 312 for transmission via a PCI bus or direct connection to the on-line rebinner. FIFO 312 is unloaded in an "on-demand" type of data flow, i.e., whenever data is present for transfer and at a rate no faster than is currently available. The PCI bus is not limited to simplex behavior. Instead, feeds back to PDR cards the current bus availability for DMA transfer, a duplex environment. Optimal sharing of the limited bus-bandwidth resource among multiple bus transactors is a primary design goal. FIFO 312 is always unloaded as fast as may be permitted by the current, dynamically changing, availability on the PCI bus. Similar to operation of FPGA 302, FGGA 312 determines whether to load FIFO 312 based on the risk of overflow.

The input nodes of FIFO 302 and FIFO 312 can be considered "lossy nodes," as packets can be lost at these nodes due to insufficient downstream bandwidth. Risk of overflow in the respective FIFO can occur while more event packets arrive that are destined for FIFO loading. Overflow results if FIFO storage capacity is insufficient to handle the loading of additional data into the FIFO chip. The respective FPGA makes this determination. The size for both event and tag packets may be 64 bits.

With respect to FIFO 302, the primary bandwidth limitation is the fiber optic output link 170. Typically, this link is a simplex, 1.0625 Gbps Fiber Channel, although upgrading can be made in the future. A 1 Gbps link may carry 64-bit packets no faster than 13.2 MHz. As long as FIFO 302 is loaded with 64-bit packets more slowly on average than the maximum unloading rate (13.2 MHz), FIFO 302 is unlikely to approach the "full" state, and no packet losses will occur. However, if for sufficiently long periods FIFO 302 is loaded at rates higher than the maximum unloading rate, FIFO 302 will approach the "full" state and there will be a risk of overflow. FPGA 300 is designed never to load event package data into FIFO 302 with any risk of overflow.

With respect to FIFO 312, the typical output bandwidth limitation is either the fixed speed of the PDR-resident rebinning pipeline circuit or the more variable availability for outgoing DMA on the busy PCI bus—whichever is smaller. The available output bandwidth often changes dynamically. The magnitude of this bandwidth is a complex function, dependent upon several factors. These factors include the changing usage and burden of the PCI bus during the acquisition, and the dynamically shifting response time of the operating system installed on the data acquisition PC, which contains the PDR card.

Figure 4:
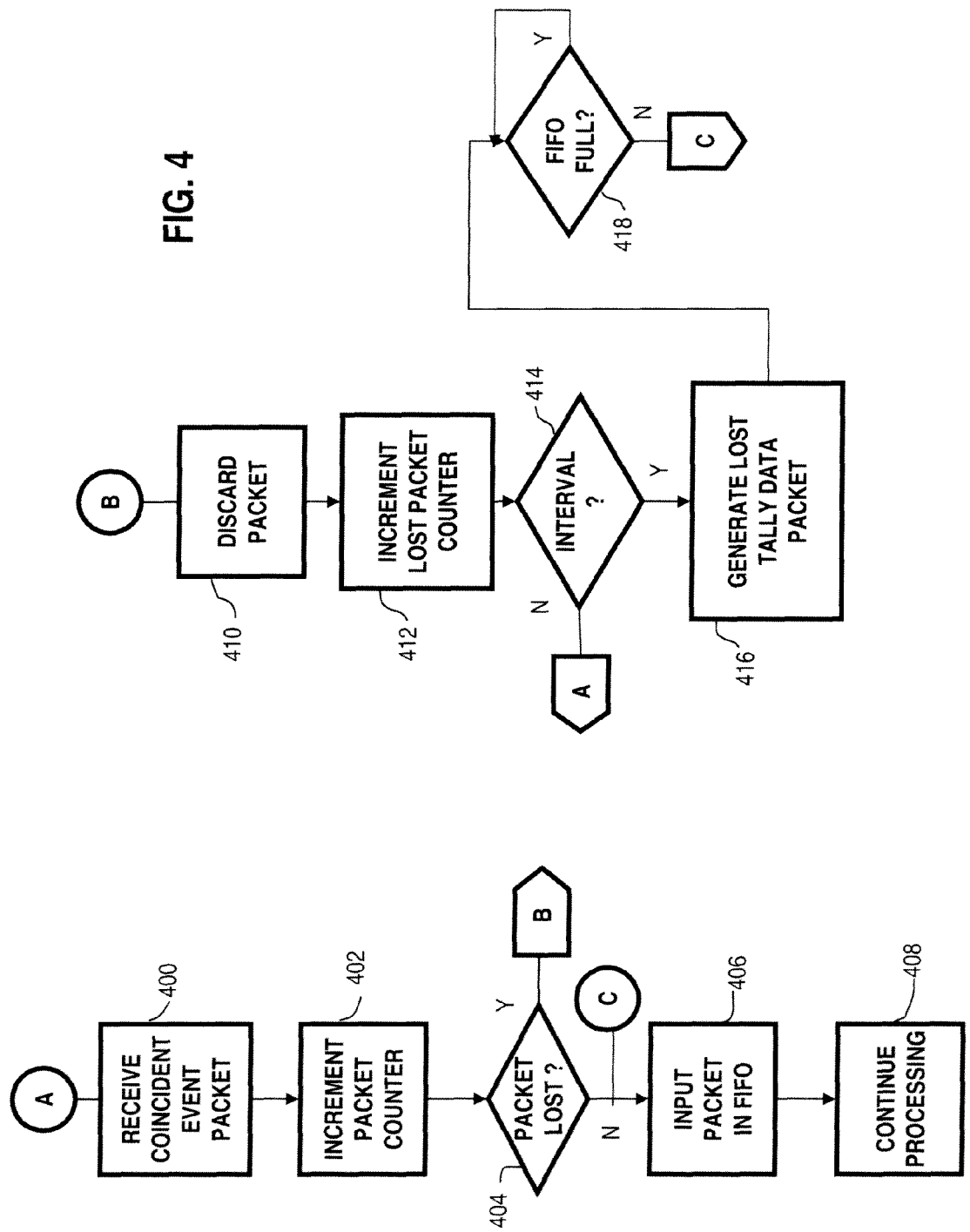
FIG. 4 is a flow chart of operation for the block diagram of FIG. 3.

Operation of the architecture represented by FIG. 3 in relation to handling packets is described with respect to the flow chart shown in FIG. 4. This flow chart is applicable to the elements of FIG. 3 for each of the gantry interface module 100 and the data acquisition processor 120.

At known intervals each FPGA will generate a "lost-event-tally tag packet," which is marked as originating from the FPGA and associated FIFO (or from the gantry interface module), thereby distinguishing between events at FIFO 302 and FIFO 312. When the FPGA automatically inserts this tag packet into the stream, by loading it to the FIFO, the tag packet provides a record for down-stream use of the total event packets lost over the previous interval. When all such tag packets are taken into account by down-stream processing, the total number of event packets lost over time may be known. Integrity of PET quantification thus may be, in part, preserved.

The interval used to determine when each lost-event-tally tag packet is generated by the FPGA is a function of the number of arriving packets, i.e., the event packets which are potentially to be loaded into the FIFO. For example, a lostevent-tally tag packet is generated after 1 M event packets arrive. For this example, two 20-bit counters would be provided (for each FPGA), one for the lost event tally and the other for the arriving events.

At step 400, a coincident event packet is received by a respective FPGA. The FPGA will increment an associated counter that maintains the number of packets received, at step 402. A determination is then made by the FPGA, at step 404, as to whether the local FIFO has sufficient capacity to store the received packet. If so, the packet is not lost and is input to the FIFO by the FPGA at step 406. Processing then continues at step 408. This step may involve processing of already received packets and/or reversion to step 400 to handle incoming packets. If determination is made at step 404 that there is insufficient capacity to store the received packet in FIFO, the packet is marked as lost and discarded at step 410. The FPGA will then increment an associated counter that maintains the number of lost packets received, at step 412.

At step 414, determination is made by the respective FPGA whether the "lost-event-tally tag packet" interval has been reached. If not, the process reverts to step 400 for handling the next incoming packet. If it is determined at step 414 that the interval has been reached, the FPGA generates a lost tally data packet at step 416. At step 418, determination is made by the FPGA as to whether the associated FIFO is full. If not, the process reverts to step 406, wherein the generated lost tally data packet is inserted in the associate FIFO for output. If, in step 418, it is determined that the FIFO is full, step 418 repeats until the sensed condition of the FIFO changes. While interval determination has been indicated to occur at step 414, this determination can be made upon incrementation of the packet counter at step 402, as the interval is dependent upon the total number of received packets.

The described operation enables determination of a single correction factor value for lost event packets for an entire projection data space. The correction factor for a specific duration of PET data collection may be computed as the product of all lossy node factors, wherein a factor may represent the percentage of arriving event packets are lost at each FIFO input. Once computed, the final product may be used to correct the projection data space bin contents.

The FIFO chips 302, 312 are observable in that the local FPGA may be informed when the FIFO is half full (HF) and almost full (AF). A hysteresis algorithm may be used by the FPGA can make use of FIFO status indicators. For example, the FPGA may always presume that the FIFO is not at risk of overflow (RO false) if the FIFO reports less than half full (HF false). If the FIFO is moving from less than half full (HF false) to more than half full (HF true), the FPGA again may presume that there is no risk of overflow. However, once the FIFO reaches the state of almost full (AF), the FPGA determines that there is a risk of overflow (RO true). RO is latched true by the FPGA until HF goes false. This hysteresis operation ensures that the FIFO always has capacity for automatic tag packet insertion. Thus generated lost tally data packets will be guaranteed of loading into the FIFO.

In summary, if an event packet must be discarded due to limitations in down-stream bandwidth or throughput anywhere along the on-line PET-stream processing chain, the only place in the architecture where this loss can occur is at the point of loading the respective lossy nodes of the FIFOs. By generation of the lost-event-tally tag packets, a full, real-time accounting is provided down stream for any event packet lost at such loading point.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, more complex systems may require that more lossy nodes be established. If more lossy nodes are added, the same techniques can apply.

What is claimed is:

1. A method comprising:
   receiving a stream of data packets at a first node in a multi-node data processing chain;
   identifying when any of the received packets are lost;
   generating a lost tally data packet at a specified interval;
   downloading the lost tally data packet to the processing chain; and
   collecting data obtained from data packets output downstream in the processing chain.

2. The method of claim 1, wherein the step of identifying comprises:
   determining an insufficient storage capacity for handling an incoming packet;
   marking the incoming packet as lost; and
   discarding the incoming packet from the processing chain.

3. The method of claim of claim 1, wherein the step of generating comprises:
   counting the number of lost packets during the specified interval; and
   including count information in the lost tally data packet.

4. The method of claim 3, further comprising:
   initiating a new count interval upon generation of the lost tally data packet.

5. The method of claim 1, wherein the step of downloading comprises:
   inserting the generated lost tally data packet into a queue for output to the data stream upon generation thereof if sufficient storage capacity currently exists; and
   delaying insertion of the generated lost tally data packet into the queue if there is insufficient storage capacity.

6. The method of claim 1, wherein the received data packets contain Positron Emission Tomography (PET) coincident event data, input at a variable rate.

7. The method of claim 6, further comprising:
   receiving data packets at a second node, downstream of the first node in the data processing chain;
   identifying when any of the received packets at the second node are lost;
   generating a lost tally data packet for packets lost at the second node; and
   downloading the lost tally data packet to the processing chain;
   wherein the step of collection further comprises adding information obtained from the lost tally data packets generated at the second node to the data obtained from data packets output by the first node.

8. The method of claim 7, wherein the step of collecting further comprises specifying a data collection interval; the method further comprising:
   formulating a correction factor value in accordance with a number of lost tally packets received during the data collection interval.

9. The method of claim 8, wherein the step of formulating comprises evaluating the collected lost packet information for each of the nodes.

10. A system comprising:
    a gantry interface module for receiving coincident event data from a PET (Positron Emission Tomography)

detector array, the interface module comprising a first FPGA (field programmable gate array) connected to a first FIFO storage;

a DMA (direct memory access) rebinner card comprising a second FPGA (field programmable gate array) connected to a second FIFO storage; and a transmission line coupled between an output of the first FPGA and an input of the second FGA;

wherein the first FPGA is configured to receive a stream of data packets, determine when the first FIFO storage has insufficient capacity to store a received packet, discard the received packet as lost, and maintain a tally of lost packets.

11. The system of claim 10, wherein the first FPGA comprises first and second counters, and the first FGPA is configured to increment the first counter with each reception of a data packet and to increment the second counter with each determination of a lost packet.

12. The system of claim 11, wherein the first FPGA is configured to generate a lost tally data packet, related to contents of the second counter, at an interval set by the first counter.

13. The system of claim 12, wherein the first FPGA is configured to store the lost tally data packet in the first FIFO when sufficient storage capacity exists therein and to output the lost tally data packet to the transmission line.

14. The system of claim 10, wherein the second FPGA is configured to receive a stream of data packets, determine when the second FIFO storage has insufficient capacity to store a received packet, discard the received packet as lost, and maintain a tally of packets lost at the second FPGA.

15. The system of claim 14, wherein the second FPGA comprises third and fourth counters, and the second FGPA is configured to increment the third counter with each reception of a data packet and to increment the fourth counter with each determination of a lost packet by the second FGPA.

16. The system of claim 15, wherein the second FPGA is configured to generate a lost tally data packet, related to contents of the fourth counter, at an interval set by the third counter.

17. The system of claim 16, wherein the second FPGA is configured to store the lost tally data packet generated by the second FPGA in the second FIFO when sufficient storage capacity exists therein.

18. The system of claim 17, wherein the DMA rebinner card is configured to specify a data collection interval and formulate a correction factor value in accordance with a number of lost tally packets received during the data collection interval.

19. The system of claim 18, wherein the correction factor is based on evaluation of the collected lost packet information for each of the first and second FPGAs.

20. The system of claim 10, wherein the transmission line comprises fiber optic cable.

* * * * *